United States Patent [19]

Hostetler

[11] Patent Number: 5,239,202
[45] Date of Patent: Aug. 24, 1993

[54] FAILSAFE INTERLOCK SWITCH

[75] Inventor: Fred L. Hostetler, Hillsboro, Oreg.

[73] Assignee: Sentrol, Inc., Portland, Oreg.

[21] Appl. No.: 621,323

[22] Filed: Nov. 30, 1990

[51] Int. Cl.[5] .............................................. H02H 3/20
[52] U.S. Cl. ........................................ 307/116; 361/88
[58] Field of Search ................. 361/13, 88, 93, 133, 361/172; 307/143, 116; 335/151, 152, 153, 205, 206; 200/61.62; 340/547

[56] References Cited

U.S. PATENT DOCUMENTS

| | | | |
|---|---|---|---|
| 3,474,695 | 10/1964 | Longval | 83/524 |
| 3,859,471 | 1/1975 | Danielsen et al. | 179/18 |
| 3,947,734 | 3/1976 | Fyler | 317/146 |
| 4,072,222 | 2/1978 | Coon | 192/131 |
| 4,210,889 | 7/1980 | Holce | 335/207 |
| 4,811,153 | 3/1989 | Sakatos | 361/88 |
| 4,847,719 | 7/1989 | Cook et al. | 361/13 |
| 4,893,027 | 1/1990 | Kammerer et al. | 307/116 |

Primary Examiner—A. D. Pellinen
Assistant Examiner—Aditya Krishnan
Attorney, Agent, or Firm—Marger, Johnson, McCollom & Stolowitz

[57] ABSTRACT

A combination of a magnetically-actuated interlock switch assembly and an actuating magnet unit, and a method for their use, in which a supply current is connected to ground potential so as to overload and open a fuse in a power supply input line when the interlock fails to open in response to absence of the actuating magnet within a required proximity to the interlock switch assembly. A more sensitive magnetic reed contact opens upon approach of the actuating magnet, before a less sensitive magnetic reed contact closes in response to closer approach of the actuating magnet to provide a biasing control voltage to a transistor which is thereby turned on to provide power to the load. Should the transistor or the switch providing the biasing voltage to the base of the transistor remain in a conductive state when the actuating magnet is removed from proximity with the switch assembly supply power is short-circuited, opening the fuse. Provision may be made for an interlock status indicator. In one embodiment a balanced combination of magnetic reed contacts may be provided to make it more difficult to override the interlock.

20 Claims, 3 Drawing Sheets

FAILSAFE INTERLOCK SWITCH

BACKGROUND OF THE INVENTION

The present invention relates to electrical interlock switches, and particularly to a magnetically actuated interlock switch which will produce an open circuit in the event of failure of one of its components.

Interlocks are switching devices used to protect machinery and operators by ensuring that electrical power is available to certain parts of the machinery only when certain components are located in required positions with respect to each other. For example, to ensure that separately driven parts of machinery do not collide with each other, an interlock provides electrical power to drive a first part of the machine only when a second part is safely out of the path of the first. Interlocks are often used to permit electrical equipment to operate only when a shield, cover, or other safety appliance is properly located in its operative position. Of at least equal importance is the use of interlocks to be sure that a machine operator is safely out of the way before power is made available to drive dangerous parts of machinery such as cutting, grinding, forging or punching machines.

In the past, interlocks were primarily mechanical switches and required frequent adjustment and maintenance in order to operate properly. Mechanically operated interlock switches often had less than the desired reliability, and it was easily possible for many such mechanically operated interlocks to be overridden in the interest of faster operation of machines equipped with mechanically operated safety interlocks. More recently, because of their greater reliability, durability, and resistance to being bypassed, magnetically actuated reed contacts have been used in interlocks where the current to be controlled is not too great, and solid-state switches such as triacs have been used for applications having somewhat higher loads. However, in the event of overloading, or as a result of long use, magnetic reed contacts may stick in a closed state, particularly if subjected to overload in a closed state. Triacs may also fail in a conductive state if subjected to electrical overload, or may be induced by spurious voltages to switch to a conductive state inappropriately.

While an interlock may be connected in series with a fuse, the fuse can protect only against overloads and does not provide the function of the interlock as regards the machinery or machine operators, if the interlock simply remains in a conductive state when it should have opened a power circuit. As a result, if a mechanical contact, a magnetic reed contact, or a triac of a prior art interlock fails in a conductive mode, when the interlock is supposed to have opened a power supply circuit, power will still be available and may permit operation of a portion of a machine at the wrong time and thus result in damage to the machine or injury to an operator.

What is needed, then, is an interlock device which is long-lasting, does not need frequent adjustment or maintenance, cannot be easily overridden or bypassed, and which reliably results in power being definitely made unavailable to the machine or equipment protected by the interlock, in the event of failure of a component of the interlock.

SUMMARY OF THE INVENTION

The present invention answers the need for an interlock circuit which definitely denies electric power to a load circuit when a desired physical relationship between two relatively movable members ceases to exist, even if a main power-carrying switch component fails to open when it should, by providing a magnetically controlled interlock device incorporating a circuit which short-circuits a power supply controlled by the interlock, opening a fuse, if the interlock does not disconnect the power supply from the load at the appropriate time.

In accordance with the present invention a magnetically actuated power control interlock device includes an electrically operated switch, for receiving and transmitting a current from a power supply source to a load; a first magnetically actuated switch for providing an electrical control current or voltage to the electrically operated switch to place it in a conductive state in response to the presence of at least a predetermined magnetic flux density; a second magnetically actuated switch, for connecting the output terminal of the electrically operated switch through a low resistance to ground or common potential unless at least a predetermined magnetic flux density is present; and a circuit interrupting device, such as a fuse, located between the power supply and the electrically operated switch, to disconnect the electrical power supply from the electrically operated switch if it remains in a conductive state when the second magnetically actuated switch is connected through the low resistance to ground or common potential.

In a preferred embodiment of the present invention the electrically operated direct current switch is a transistor, and the magnetically actuated switches are magnetic reed contacts of different sensitivities, located in general proximity with each other. The magnetic reed contacts in such a preferred embodiment are connected so that as magnetic flux density increases the more sensitive one disconnects the output of the transistor from a low resistance conductive path to a common or ground potential before the other magnetic reed contact closes and provides a biasing voltage to turn the transistor on. The interlock preferably includes a switch circuit assembly mounted on one part of an apparatus requiring an interlock device, and an actuating magnet mounted on a second, relatively movable, portion of the apparatus, so that the power output from the interlock device is available to a load only when the actuating magnet is within a predetermined distance from the switch assembly, as a result of the proper relative positions of the two relatively movable bodies. Upon movement of the actuating magnet away from the switch circuit assembly the less sensitive magnetic reed contact first opens to disconnect the biasing voltage from the transistor, and the more sensitive magnetic reed contact thereafter closes the low-resistance circuit between the transistor and common potential, to overload and open a fuse located electrically between the power supply and the transistor, if the transistor remains conductive.

The invention further comprises the method of controlling provision of power to a load by providing a magnetic flux density related in value to the proximity of two relatively movable portions of a machine and operating a switching circuit to control availability of power in response to the magnetic flux density.

It is therefore a principal object of the present invention to provide an interlock device which results in a disconnected power supply circuit in the event of failure of a primary electrical switch component of the interlock device.

It is a further object of the present invention to provide an interlock device whose characteristic of failure resulting in a safe, non-conductive condition cannot easily be overridden.

It is a feature of a preferred embodiment of the invention that it provides a visible indication when the interlock is activated to connect a supply of power to a load circuit.

It is a further feature of one embodiment of the present invention that it requires a particular combination of magnetic fields to actuate the interlock, so that the interlock cannot easily be defeated when used to ensure safety of a machine operator.

It is an advantage of an interlock according to the present invention that it is safer than previously available interlock switch devices, because a failure of any of the electric current controlling components of the interlock according to the present invention will result in disconnection of the power supply by opening of a fuse so that power cannot thereafter be provided to the load circuit through the interlock device.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
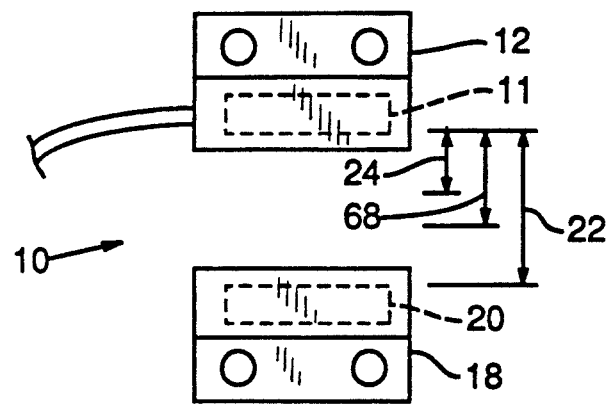
FIG. 1 is a view showing a magnetically actuated interlock device according to the invention and including a switch assembly and an actuating magnet units.

Referring now to FIG. 1 of the drawings which form a part of the disclosure, an interlock device 10 which is one embodiment of the invention includes a switch circuit assembly 11 contained within a housing 12. A mounting flange 14 includes bolt holes for mounting the housing in a desired location. A cable or conduit 16 protectively contains electrical conductors for use in connecting the interlock 10 to an electrical power supply and to a load circuit to provide power controlled by the interlock 10. In appropriate situations the cable or conduit 16 may be armored and weather-tight.

A second housing 18 may be similar to the housing 12 and contains an actuating magnet 20 to attach the actuating magnet to an object which is movable with respect to the location of the housing 12.

The interlock switch assembly 11 is responsive to the magnetic flux density surrounding it, so that the state of the interlock 10 is controlled by the proximity between the actuating magnet 20 contained within the housing 18 and the switch assembly 11 contained within the housing 12. Thus, when the housing 18 is separated from the housing 12 by at least a distance 22, the switch assembly 11 provides an open circuit between a power supply and the load controlled by the interlock 10. When the housing 20 is within a predetermined actuating distance 24 from the housing 12, on the other hand, the interlock 10 provides a closed circuit to conduct power from a supply to the load.

Figure 2:
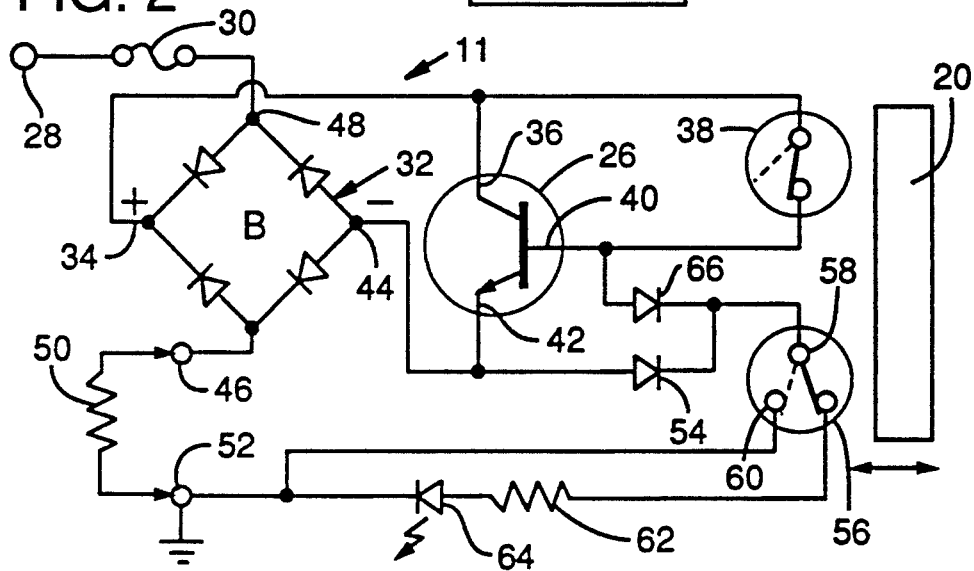
FIG. 2 is a schematic diagram of a circuit embodying the present invention, for use in a switch assembly of an interlock device such as the one shown in FIG. 1.
Figure 3:
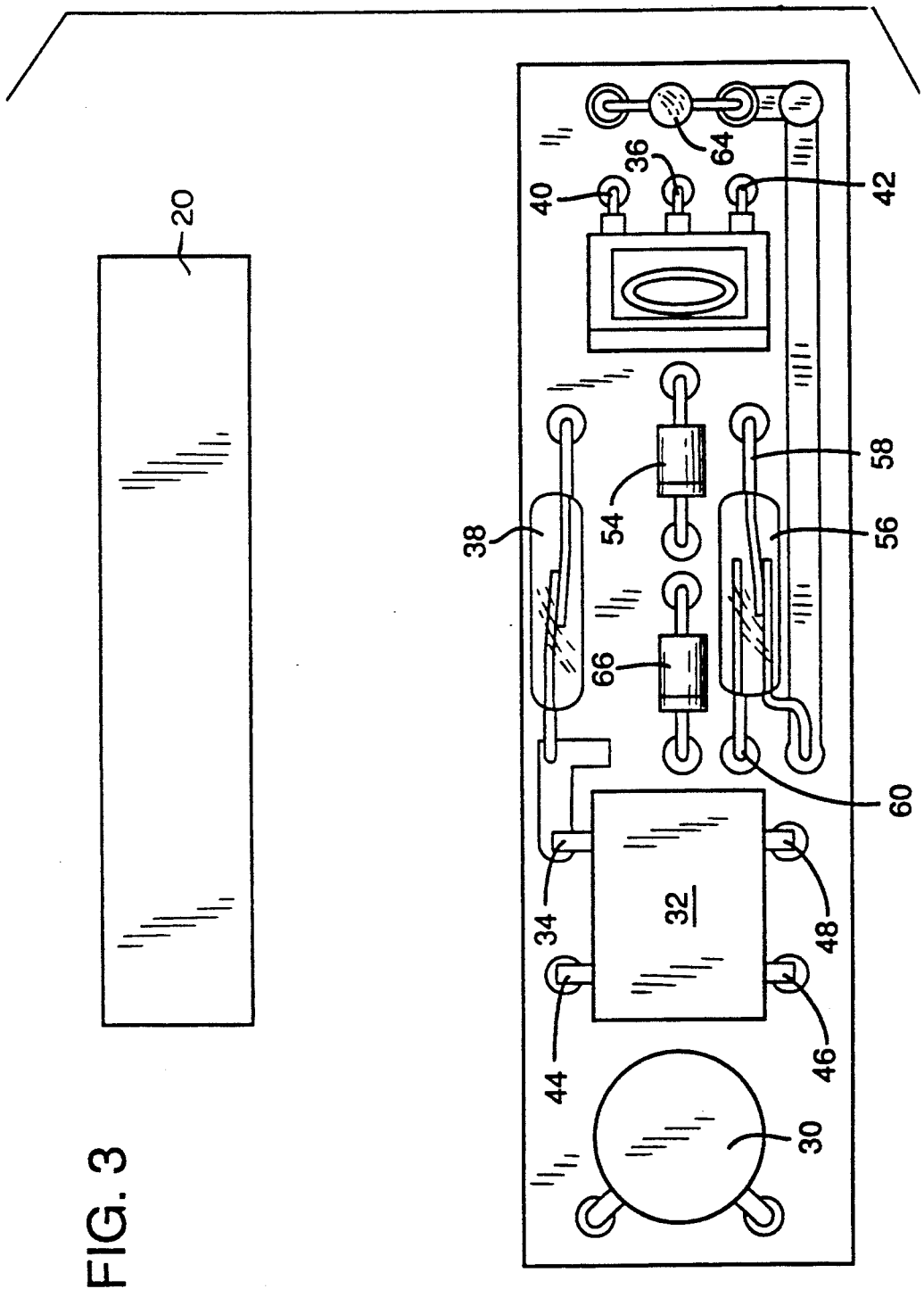
FIG. 3 is a top plan view of a circuit board carrying the interlock device circuit shown in schematic form in FIG. 2, together with a permanent magnet for actuating the interlock device.

Referring now also to FIGS. 2 and 3, the circuit of the switch assembly 11 which is one embodiment of the present invention includes an electrically controlled switch, in the form of a transistor 26. A power supply input terminal 28 is connected through a fuse 30 to a supply terminal 48 of a four-diode bridge 32, whose positive terminal 34 is connected to the collector 36 of the transistor 26. The positive terminal 34 is also selectively connected to the base 40 of the transistor 26, by way of a magnetically controlled switch, such as a magnetic reed contact 38. The magnetic reed contact 38 is of a normally-open circuit, or Form A, configuration, so that a sufficient magnetic flux density will close the contact, providing a biasing voltage to the base 40 to turn on the transistor 26 when the supply voltage provided from positive terminal 34 of the bridge 32 is high enough.

The emitter 42 of the transistor 26 is connected to the negative terminal 44 of the bridge 32. An output or load terminal 46 of the bridge 32, located diagonally opposite the input terminal 48, is connected to an electrical load 50, such as a power circuit for a part of a machine, connected between the output terminal 46 and a common, or ground terminal 52. Thus, a supply potential, either AC or DC, may be applied across the power supply input terminal 28 and the common terminal 52, and when the magnetic reed contact 38 is closed the transistor 26 will be turned on to deliver power from the output terminal 46 of the bridge 32 to the load 50.

A diode 54 is also connected to the emitter 42 in parallel with the connection to the negative terminal 44, and a second magnetically actuated switch, preferably a magnetic reed contact 56 of the single-pole, double-throw, or Form C, type has its common pole input terminal 58 connected to the negative, or output, side of the diode 54 and has its normally-closed side terminal 60 connected to the common terminal 52, so that there is a low-resistance path through the normally-closed side of the magnetic reed contact 56 to the common terminal 52 unless a sufficient magnetic flux density is present to open the normally-closed circuit side of the magnetic reed contact 56. Preferably, the normally-open circuit side terminal 61 of the magnetic reed contact 56 is connected to the common or ground terminal 52 in parallel with the conductor connected to normally-closed contact terminal 60, but through a resistor 62 and a light-emitting diode 64 connected in series. When the magnetic reed contact 56 is actuated by a sufficient magnetic flux density and the transistor 26 is conductive, current is conducted through the diode 54 and resistor 62 to activate the light-emitting diode 64 as an indication that the switch assembly 11 is actuated to provide power to the load 50. The resistor 62 is chosen of a sufficiently high value that only the current required to operate the light-emitting diode can be carried through that branch of the circuit, while the majority of the emitter current of the transistor 26 proceeds through the bridge 32 to the load 50.

As shown particularly in FIG. 3, both the magnetic reed contact 38 and the magnetic reed contact 56 are preferably of the well-known glass-encapsulated type. They are located in close enough proximity to one another that the magnetic field of the actuating magnet 20 provides a sufficient magnetic flux density to actuate both of the magnetic reed contacts 38 and 56 when the housings 12 and 18 are located within the actuating distance 24.

It is an important aspect of the present invention, however, that the magnetically actuated switch in the position of the magnetic reed contact 56 must open the circuit between the terminals 58 and 60 slightly prior to closure of the magnetically actuated switch in the position of the magnetic reed contact 38, as magnetic flux density in the vicinity of the switch assembly 11 increases, in order to ensure that the current from the emitter 42 is carried to the common terminal 52, through the bridge 32 to the load 50, and is not carried through the diode 54 once the transistor 26 has been biased to a conductive state by closure of the magnetic reed contact 38.

A diode 66 is connected between the base 40 and the common terminal 58 of the magnetic reed contact 56, in parallel with the diode 54. This connection also provides a second path for current from the positive terminal 34 of the bridge 32 to the common terminal 58 of the magnetic reed contact 56 when the magnetic reed contact 38 is in a closed state. Normally, however, the current through the diode 66 will be kept small by the resistor 62, since the magnetic reed contact 56 will also be magnetically actuated when the magnetic reed contact 38 is closed.

In normal operation of the interlock 10, the switch assembly 11 provides an output potential to the load 50 across the terminals 46 and 52 when the housing 18 containing the actuating magnet 20 is within the actuating distance 24 from the housing 12 enclosing the switch assembly 11 so that both the magnetic reed contact 38 and the magnetic reed contact 56 have been magnetically actuated by the magnetic flux density provided by the actuating magnet 20.

Thus, with the magnetic reed contacts 38 and 56 in proximity with each other within the housing 12 the magnetic reed contact 56 must actuate at a lower magnetic flux density than that required by the magnetic reed contact 38. As the actuating magnet 20 approaches the switch assembly 11 the magnetic reed contact 56 first opens the low resistance conductive path through terminal 60 to the common terminal 52, and only thereafter does the magnetic reed contact 38 close to provide biasing voltage to the base 40 to turn on the transistor 26 to supply current to the load 50. The combination of characteristics of the magnetic reed contact 38 and the actuating magnet 20 will determine the precise actuating distance 24 at which the transistor 26 will be turned on. Consequently, as the actuating magnet 20 approaches the switch assembly 11, the magnetic reed contact 56 will be actuated, opening the low resistance circuit to the common terminal 52, when the housing 18 is spaced apart from the housing 12 by a distance 68 which is at least slightly greater than the distance 24.

It will also be appreciated that the magnetically actuated switches such as the magnetic reed contacts 38 and 56 must operate with a sufficiently small hysteresis, the difference between the magnetic flux density required to actuate the contacts magnetically and the flux density at which the spring force of the reed overcomes the magnetic force of attraction to allow the magnetic contacts to separate as flux density decreases. The hysteresis must be small enough that the switch in the position of the magnetic reed contact 38 will open, turning off the transistor 26, before the switch in the position of the magnetic reed contact 56 ceases to be magnetically actuated and completes the low-resistance path through terminal 60 to the common or ground terminal 52 as the actuating magnet is moved away from the switch assembly 11.

Thus, as the actuating magnet 20 moves away from the switch assembly 11 the magnetic reed contact 56 will also cease to be magnetically actuated, and its normally-closed side will close, completing the low resistance path through terminal 60 to the common terminal 52. An increased current will then be carried through the transistor 26 and the diode 54 long enough to open the fuse 30.

Furthermore, should the magnetic reed contact 38 fail to open, so that the transistor 26 remains conductive, as soon as the magnetic reed 56 becomes magnetically deactivated, closing the low resistance path through its normally-closed side terminal 60 to the common terminal 52, a higher current will be able to pass through the diodes 54 and 66 in parallel with the load 50, also overloading and opening the fuse 30.

Should the transistor 26 fail in an open state while the magnetic reed contact 38 fails in a closed state, the diode 66 will conduct current sufficient to overload and open the fuse 30 as soon as the magnetic reed contact 56 ceases to be magnetically actuated, closing the normally-closed side and completing the low-resistance path to the common terminal 52.

As a result, should either the magnetic reed contact 38 or the transistor 26 fail to operate properly the interlock 10 will, nevertheless, disconnect the power supply from the load 50 when the actuating magnet 20 reaches the appropriate distance 68 from the switch assembly 11.

The resistor 62 limits the current carried through the normally-open side of the magnetic reed contact 56, and thus makes it highly unlikely that the contacts providing current to the resistor 62 and LED 64 would fail to separate upon decrease of magnetic flux density. On the other hand, should the normally-closed contacts connected to terminal 60 of the magnetic reed contact 56 fail to open in the presence of what should be sufficient magnetic flux density the result would be that the fuse 30 would be overloaded and open the supply circuit to the bridge terminal 48 so that current is no longer available to the load 50.

Since the failure of the fuse 30 is normally an indication that there has been a failure of either the transistor 26 or one of the reed contacts 56 and 38, the fuse 30 is preferably not of an easily-replaceable type, and the entire switch assembly 11 would normally be replaced once the fuse 30 has opened.

Suitable circuit components for an exemplary switch assembly 11 are shown in Table I below.

TABLE I

| Reference Numeral From FIG. 2 | Component Description/Commercial Commercial Part No. |
| --- | --- |
| 26 | Transistor - Motorola MJE13002 |
| 30 | Fuse - 3 amp |
| 32 | Bridge 1½ amp, Liteon No. PBDF 154 |
| 38 | Form "A" magnetic reed contact - 25-30 amp-turn |
| 54, 66 | Diodes - Motorola IN4004 |
| 56 | Form "C" magnetic reed contact - 10-15 amp-turn |
| 62 | Resistor - 4700 ohm - ⅛ watt |
| 64 | L.E.D. - 5-50 milliamps |

The three ampere capacity of the fuse 30 provides the ability to carry brief current surges resulting from disconnection of an inductive load. While larger diodes 54 and 66 could also be used, the components shown in Table I are capable of carrying enough current for a long enough time to cause the fuse 30 to fail.

An interlock 10 including such a switch assembly 11 would preferably be used, for example, with a cylindrical bar actuating magnet 20 1½ inches long by ¼ inch diameter and magnetized to at least 1000 gauss in an interlock 10 intended to carry a load of about 300 watts at 220 volts AC.

Figure 4:
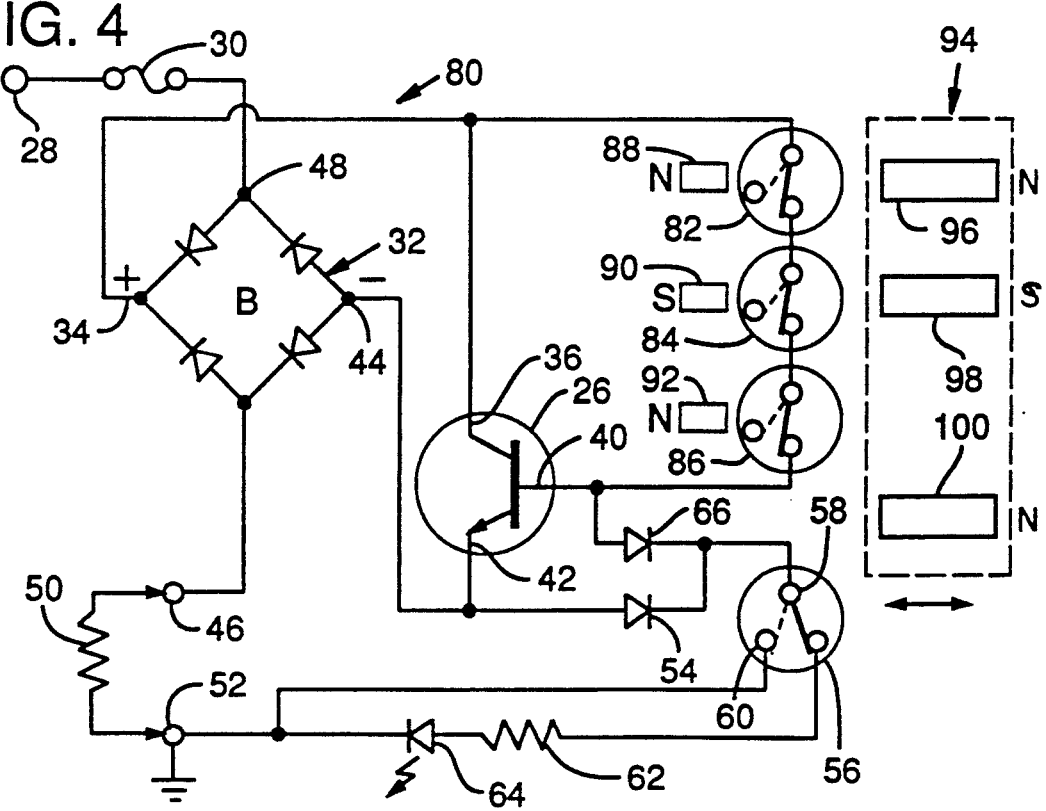
FIG. 4 is a schematic diagram of a circuit for a switch assembly for an interlock device including a high security magnetically balanced switch arrangement which is an alternative embodiment of the present invention.
Figure 5:
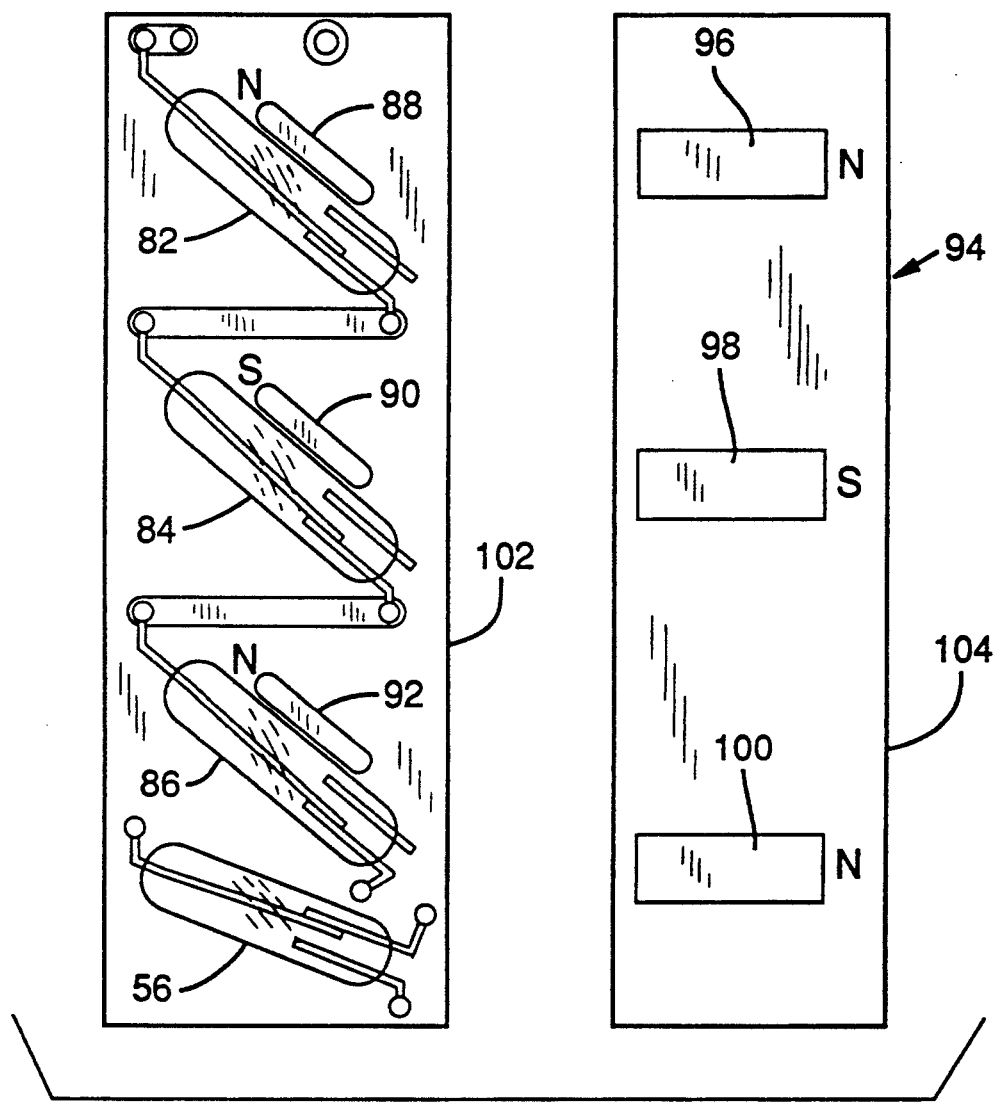
FIG. 5 is a pictorial top plan view showing an exemplary arrangement of magnetic reed contacts and a corresponding arrangement of permanent magnets in an actuating unit for the switch assembly shown schematically in FIG. 4.

Referring now to FIGS. 4 and 5 of the drawings, a switch assembly 80 is similar in most respects to the switch assembly 11, and like components are shown by the use of like reference numerals. The switch assembly 80, however, is intended to provide increased resistance to attempts to defeat the interlock in certain applications, as where an interlock device is used to prevent operation of machinery in an unsafe configuration or manner. Thus instead of a single normally-open magnetic reed contact such as the magnetic reed contact 38 used in the switch assembly 11, the switch assembly 80 includes three series-connected magnetically actuated switches requiring a particular polarity or flux density to close the circuit to the base 40. Preferably, Form "C" magnetic reed contacts 82, 84 and 86, are each equipped with a respective small permanent magnet 88, 90, 92 that provides sufficient magnetic flux density to magnetically actuate the respective one of the reed contacts 82, 84, and 86. The circuit to the base 40 is connected through the normally-closed side of each of the magnetic reed contacts, although the permanent magnets 88, 90, 92 keep the normally-closed side of each of magnetic reed contact open. Provision of the required biasing voltage to the base 40 thus requires the provision of a magnetic flux with a particular polarity and flux density with respect to each of the magnetic reed contacts 82, 84 and 86, in order to provide a closed circuit to the control terminal or base 40 of the electrically operated switch such as the transistor 26, through the entire series of magnetic reed contacts 82, 84 and 86. Thus, the reed contacts 82, 84 and 86 operate in response to the proximity of an actuating magnet assembly including three separate actuating magnets 96, 98, and 100 which oppose the small magnets 88, 90 and 92 and permit the normally-closed side of each magnetic reed contact to close.

As may be seen best in FIG. 5, the magnetic reed contacts 82, 84, and 86 are preferably mounted on a support such as a circuit board 102, including appropriate conductors and terminals for connecting the magnetic reed switches to the other components of the switch assembly 80, in predetermined respective physical locations. The actuating magnets 96, 98, and 100 are appropriately arranged and similarly spaced apart from each other, as by being adhesively mounted on a mounting base 104 of non-magnetic material, and contained in a suitable housing (not shown). When the actuating magnet assembly 94 is brought near the switch assembly 80, the respective actuating magnets 96, 98, and 100 approach the magnetic reed contacts 82, 84, and 86 so as to provide the required opposing magnetic flux density to close all of the reed contacts 82, 84, and 86, but only after the magnetic reed contact 56 has first been opened from its normally closed-circuit condition with respect to the low resistance connection between the diodes 54 and 66 and the common or ground terminal 52. The magnetic reed contact 56 is physically located adjacent one of the magnetic reed contacts 82, 84, and 86, where the appropriate one of the actuating magnets 96, 98, and 100 provides the required magnetic flux density to actuate the magnetic reed contact 56 magnetically as the actuating magnet assembly 94 approaches the switch assembly 80. Except for the presence of the magnetic reed contact 56 in proximity with one of the reed contacts 82, 84, and 86, the combination of reed contacts 82, 84, 86 and actuating magnet assembly 94 is similar to the operation of the magnetically actuated sensing device disclosed in U.S. Pat. No. 4,210,889, of which the disclosure is hereby incorporated herein by reference. It will be understood that the magnetic reed contact 56 could also be provided with a small permanent magnet and be connected by its magnetically actuated side through lowresistance path to the common terminal 52, requiring an opposite balancing magnetic flux density to permit the mechanically-closed contacts to close when the actuating magnet combination, properly oriented, approaches the switch assembly 80.

The operation of the switch assembly 80 is basically the same as that of the switch assembly 11, except for the fact that all three of the magnetic reed contacts 82, 84, 86 must close in order to make available the biasing voltage necessary to turn on the transistor 26. For that reason it is therefore much more difficult to turn on the transistor 26 in the switch assembly 80 than where only a single magnet is required both to open the low-resistance circuit to ground and turn on the transistor 26. As a result, improper attempts to operate an interlock device including the switch assembly 80 are unlikely to be successful and would probably result in overloading the fuse 30, with the result that current is not made available to the load 50 when an unsafe condition exists.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A magnetically actuated electrical power control device, comprising:
   first magnetically actuated switch means for connecting a load current to a load in response to the presence of a first predetermined magnetic flux density, said first switch means having open and closed normal operating positions and a welded closed failure condition;
   second magnetically actuated switch means connected to form a series current pathway through said first magnetically actuated switch means under the welded closed failure condition and connected across the load for diverting said load current to a common potential when closed and said first magnetically actuated switch means is in the welded closed failure condition, the second switch means having an open operating position in the presence of a second predetermined magnetic flux density and biased to a normally closed position in the absence of at least said second flux density, said first predetermined magnetic flux density being greater than said second predetermined magnetic flux density; and means coupled in the series current pathway through the first and second switch means for disconnecting said load current from said load in response to a demand for current in excess of a predetermined value.

2. The device of claim 1 wherein said means for disconnecting said load current from said load is a fuse capable of carrying a current normally demanded by said load, but which will open as a result of the current carried to common potential through said second magnetically actuated switch means when said second magnetically actuated switch means is in the closed position and said first magnetically actuated switch means is in the welded closed failure condition.

3. The device of claim 1 wherein said first magnetically actuated switch means includes a normally open magnetic reed contact and said second magnetically actuated switch means includes a normally-closed magnetic reed contact.

4. The device of claim 1, further including a permanent magnet capable of providing at least said first predetermined magnetic flux density, and means for mounting said permanent magnet on an object whose location with respect to the location of said first magnetically actuated switch means and second magnetically actuated switch means is desired to be monitored.

5. The device of claim 1 wherein said second magnetically actuated switch means includes a magnetic reed contact having a normally closed terminal and a normally open terminal, said device including electrically operated status indicator means electrically connected with said normally open terminal for indicating that said power control device is in a conductive state for delivering said load current to said load.

6. A method for controlling the availability of a load current to a load in response to the distance between a pair of relatively movable members, comprising:
providing a supply voltage to a switch assembly unit including at least first and second magnetically actuated switches connected to from a series current pathway to a common potential, the switches each having an open position and a closed position;
coupling the first switch across the load;
coupling the second switch to apply the load current to the load when closed;
coupling an overload protection device in the series current pathway with the first and second switches;
providing a magnetic flux density, in proximity to said magnetically actuated switches, which increases in response to movement of said movable members toward each other;
decreasing said magnetic flux density in response to relative movement of said movable members away from each other;

operating the first switch to open the circuit across said load in response to an increase of said magnetic flux density to at least a first predetermined value in proximity to the first switch; and closing the second switch in response to an increase of said magnetic flux density to at least a second predetermined value which is greater than said first predetermined value in proximity to the second switch;

closing the first switch to create a short circuit across said load in response to a decrease of the magnetic flux density below said first predetermined value, so as to provide a path for current to flow to said common potential through said first and second magnetically operated switches with an intensity sufficient to interrupt the supply of current by opening the overload protection device, when said second magnetically operated switch is closed and said flux density is below said first value.

7. The method of claim 6 including the further step of mounting an actuating source of magnetic flux on one of said relatively movable bodies in such a position that it provides a predetermined pattern of magnetic flux surrounding said switch assembly when said relatively movable bodies are in a predetermined condition of proximity with each other.

8. The method of claim 6 including the step of providing current sufficient to operate a load to said electrically actuated switch through a fuse, and wherein said step of opening said overload protection device includes opening said fuse.

9. The method of claim 6, including the further step of rectifying the supply current prior to providing it to the input side of said electrically actuated switch device.

10. A method according to claim 6 including normally opening the second magnetically operated switch when said flux density is below said first value.

11. The device of claim 1 further comprising an electrically operated switch connected in parallel with said first magnetically actuated switch means, said electrical switch having input terminal for receiving the load current, a control terminal for receiving a control signal from said first magnetically actuated switch means when said first magnetically actuated switch means is in the closed position, and an output terminal for providing the load current to the load when said control signal is received at the control terminal.

12. The device of claim 11 wherein said electrically operated switch is a transistor and said control terminal is a base terminal of said transistor.

13. The device of claim 11 wherein said first magnetically actuated switch means is connected electrically to a supply of load current in parallel with said input terminal, and further including a diode connected between said control terminal and said second magnetically actuated switch means, and further including diode bridge means for full-wave rectifying said load current so that the load current flows through said electrically operated switch solely in a forward direction.

14. The device of claim 12, said output terminal being electrically interconnected with said second magnetically actuated switch means through a diode, and wherein said load circuit interconnects said output terminal with said common potential in parallel with said second magnetically actuated switch means.

15. The device of claim 12 wherein said first magnetically actuated switch means is connected to a supply of load current in parallel with said input terminal, and further including a diode connected between said control terminal and said second magnetically actuated switch means.

16. The device of claim 12, further including diode bridge means for full wave rectifying said load current so that the load current flows through said transistor solely in a forward direction.

17. The device of claim 12 wherein said first magnetically actuated switch means includes a normally-open magnetic reed contact and said second magnetically actuated switch means includes a normally closed magnetic reed contact.

18. The device of claim 12 further including a first diode connected in series with said second magnetically actuated switch means between said output terminal and a common potential, and wherein said load is connected between said output terminal and said common potential in parallel with said first diode and second magnetically actuated switch means.

19. The device of claim 18 wherein said first magnetically actuated switch means is connected electrically between said supply and said control terminal in parallel with said input terminal, and further including a second diode interconnecting said control terminal and a node in said circuit between said first diode and said second magnetically actuated switch means.

20. The device of claim 19, wherein said second magnetically actuated switch means is a magnetic reed contact having a normally-closed side terminal and a normally-open side terminal, said device including electrically operated status indicator means electrically connected with said normally-open side terminal for indicating that said power control device is in a conductive state for delivering said load current from said supply to said load.

* * * * *